(12) United States Patent
Hirota et al.

(10) Patent No.: US 6,776,007 B2
(45) Date of Patent: Aug. 17, 2004

(54) METHOD OF MOLDING A GLASS COMPOSITION INTO AN OPTICAL ELEMENT

(75) Inventors: Shin-Ichiro Hirota, Tokyo (JP); Yu Oogami, Tokyo (JP); Kazuaki Hashimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/439,188

(22) Filed: May 16, 2003

(65) Prior Publication Data

US 2003/0200766 A1 Oct. 30, 2003

Related U.S. Application Data

(62) Division of application No. 09/437,947, filed on Nov. 12, 1999, now Pat. No. 6,588,231, which is a division of application No. 09/150,894, filed on Sep. 10, 1998, now Pat. No. 6,151,915, which is a division of application No. 08/715,415, filed on Sep. 18, 1996, now Pat. No. 5,919,718.

(30) Foreign Application Priority Data

Sep. 18, 1995 (JP) ............................. 7-238671

(51) Int. Cl.[7] ............................. C03B 40/02
(52) U.S. Cl. ............................. 65/26; 65/169; 65/170; 65/374.11; 65/374.13; 65/374.15
(58) Field of Search ............................. 65/24, 25.1, 26, 65/32.1, 32.5, 127, 157, 169, 170, 182.2, 374.11, 374.13, 374.15; 501/54

(56) References Cited

U.S. PATENT DOCUMENTS 3,961,927 A 6/1976 Alderson et al.
4,438,211 A 3/1984 Mennemann et al.
4,460,696 A 7/1984 Harada et al.
4,521,524 A 6/1985 Yamashita
4,600,425 A 7/1986 Krumwiede et al.
4,686,196 A 8/1987 Gliemeroth et al.
4,812,423 A 3/1989 Kodama et al.
5,039,631 A 8/1991 Krashkevich et al.
5,125,949 A 6/1992 Hirota et al.
5,364,433 A 11/1994 Nishimura et al.
5,472,918 A 12/1995 Onozawa
5,676,723 A 10/1997 Taniguchi et al.
5,679,125 A 10/1997 Hiraiwa et al.
5,744,409 A 4/1998 Hashimoto et al.
5,919,718 A 7/1999 Hirota et al.
6,151,915 A 11/2000 Hirota et al.

FOREIGN PATENT DOCUMENTS

| JP | 63-45134 | 2/1988 |
|----|----------|--------|
| JP | 2-120245 | 5/1990 |
| JP | 2-199036 | 8/1990 |
| JP | 4-61816 | 10/1992 |
| JP | 5-201743 | 8/1993 |
| JP | 6-345461 | 12/1994 |
| JP | 8-104528 | 4/1996 |

OTHER PUBLICATIONS

Machine translation of JP 06–345461 (Izumitani).*

* cited by examiner

*Primary Examiner*—Sean Vincent
(74) *Attorney, Agent, or Firm*—Sughrue Mion, PLLC (57) ABSTRACT

A mold has a moling surface of a material containing silicon carbide and/or silicon nitride as a main component and a carbon thin film formed on the molding surface to prevent fusion sticking. A glass substance which has a sag point not higher than 565° C. and a predetermined composition free from arsenic oxide is introduced into the mold. The glass substance is press-formed in a heated and softened condition into a glass optical element of high precision.

32 Claims, 3 Drawing Sheets

THE NUMBER OF TIMES OF PRESS-FORMING BEFORE THE MOLD CAN NOT BE USED DUE TO PULLOUT

METHOD OF MOLDING A GLASS COMPOSITION INTO AN OPTICAL ELEMENT

This is a divisional of application Ser. No. 09/437,947 filed Nov. 12, 1999, now U.S. Pat. No. 6,588,231 which is a Divisional Application of U.S. application Ser. No. 09/150,894 filed Sep. 10, 1998, now U.S. Pat. No. 6,151,915, which is a Divisional Application of U.S. application Ser. No. 08/715,415 filed Sep. 18, 1996, now U.S. Pat. No. 5,919,718; the above noted prior applications are all hereby incorporated by reference.

BACKGROUND OF THE INVENTION

This invention relates to a method of producing a glass optical element with a high precision and to a glass substance processed by the method into the glass optical element.

A wide variety of development and research have been made about the technique of press-forming or press-molding a glass substance within a mold to produce a glass optical element of high precision. For example, one attempt has been directed to a mold which has a molding surface of silicon carbide, silicon nitride, and the like.

Herein, silicon carbide and silicon nitride are excellent in hardness and strength against a high temperature. Such a molding surface of silicon carbide and/or silicon nitride may be deposited by a chemical vapor deposition (CVD) method. In this event, the molding surface has an excellent compactness without occurrence of surface defects, such as pores, and can be polished into a mirror surface. However, the molding surface of such materials is liable to be oxidized to form a silicon oxide surface layer of several tens of angstroms thick. In this case, it has been pointed out that fusion sticking often takes place between the molding surface and the glass substance during a press-forming step when the glass substance is composed of borosilicate glass or silicate glass containing a large amount of modification components, such as alkali or alkaline earth positive ions. Moreover, stress is concentrated in a following cooling step here and there on the molding surface, which causes cracks to occur on the molding surface. This results in a phenomenon such that the molding surface of the mold is scooped or removed in spots. This phenomenon will hereinafter be simply called a "pullout" or a "pullout" phenomenon.

Taking the above into consideration, Japanese Patent Publication (B4) No. 61816/1992 and Japanese Unexamined Patent Publication (A2) No. 199036/1990 disclose a method of forming a carbon thin film on the molding surface of silicon carbide or silicon nitride. The carbon thin film may be either a hard carbon film or an i-carbon film and serves to prevent the above-mentioned fusion sticking of the glass substance to the mold. By coating the molding surface of silicon carbide or silicon nitride with the carbon thin film, the fusion sticking and the pullout can effectively be avoided. Thus, the carbon thin film is helpful to release from the molding surface the glass substance pressed by the mold and may be called a releasing thin film.

However, it is impossible to form a perfect carbon thin film which is free from defects and which completely covers an entire area of the molding surface of the mold. In other words, film defects are microscopically observed in the carbon thin film. This fact is disclosed in Japanese Unexamined Patent Publication (A2) No. 120245/1990 and well known in the art.

If the carbon thin film has such film defects, silicon carbide or silicon nitride of the molding surface is exposed through the film defects of the carbon thin film and locally oxidized to form the silicon oxide surface layer. Such local oxidization of the molding surface causes the pullout to occur due to both the fusion sticking of the glass substance to the mold and the stress concentration during repetition of the press-forming step and the cooling step.

In addition, the carbon thin film is not permanently invariable and may be peeled off from the mold by repetition of the press-forming step followed by the cooling step as a result of oxidization of silicon carbide or silicon nitride, which weakens the adhesion strength of the carbon thin film.

Taking the above into consideration, the carbon thin film is forcibly detached and removed from the molding surface after these steps are repeated over a predetermined period. Thereafter, a new carbon thin film is formed to reproduce or reuse the mold.

However, the film defects inevitably take place in the new carbon thin film. If the press-forming step is repeated by the use of the mold with the film defects left in the carbon thin film, the pullout is caused to occur as described in the foregoing. The spread of the pullout not only results in degradation of a glass optical element but also in an unrecoverable damage of the mold.

As described above, it is technically impossible in an industrial scale to form a non-defect carbon thin film and also to completely cover the entire area of the molding surface of the mold with such non-defect carbon thin film.

Under the circumstances, consideration might be directed to the glass substance to be processed by press-forming. However, no disclosure has been made yet about an effective glass substance.

Recently, Japanese Unexamined Patent Publication (A2) No. 345461/1994 proposes a glass substance which includes neither arsenic oxide nor antimony oxide and which can be readily press-formed. Specifically, this proposal is based on the following facts. Namely, a dense crown glass is exemplified as a glass substance which contains by weight 0.2% arsenic oxide and 0.2% antimony oxide as a refining agent and a decoloring agent. The glass substance is placed in a mold which has a molding surface coated with an amorphous diamond-like carbon thin film and is heated to a temperature between 750° C. and 1250° C. In this event, reaction occurs between the carbon thin film and oxygen gas released from arsenic oxide and antimony oxide. As a consequence, the carbon thin film is oxidized, consumed, and partly peeled off. In order to avoid such reaction, arsenic oxide and antimony oxide are excluded from the glass substance proposed in the above-mentioned publication.

However, exclusion of both arsenic oxide and antimony oxide from the glass substance brings not only about deterioration of a seed-free characteristic of a glass melt but also about decoloration of the resultant glass article. It is therefore required to solve these disadvantages.

SUMMARY OF THE INVENTION

It is an object of this invention to provide a method of producing a glass optical element, which can preferably suppress a pullout phenomenon of a mold.

It is another object of this invention to provide a glass substance which is capable of effectively reducing occurrence of the pullout.

It is still another object of this invention to provide a glass optical element which is produced from the glass substance.

Typically, a glass substance which has a predetermined glass composition and a predetermined sag point is press-formed at a glass viscosity between $10^7$ and $10^9$ poises.

The present inventors have investigated the cause of the reaction between a carbon thin film and a glass substance during the press-forming step and the peel-off of the carbon thin film. This leads to the findings which will presently be described. At first, consideration is made about consumption of the carbon thin film resulting from the reaction between the carbon thin film and the glass substance being press-formed. At a high temperature not lower than 750° C. and a low glass viscosity not higher than $10^5$ poises, the carbon thin film is oxidized and consumed by oxygen released from arsenic oxide and antimony oxide, as described in the above-mentioned Japanese Unexamined Patent Publication (A2) No. 345461/1994. In contrast, at a low temperature of 630° C. and within the above-mentioned high viscosity range typically used in the press-forming step, oxidization of the carbon thin film by arsenic oxide and antimony oxide contained in the glass is very little as far as a nonoxidizing atmosphere is maintained. Thus, there is no significant difference between presence and absence of arsenic oxide and antimony oxide. By repetition of the press-forming step, silicon carbide is gradually oxidized through defective portions of the carbon thin film to form a surface layer of silicon oxide. In this event, the adhesion strength between the carbon thin film and the molding surface is gradually weakened. This results in peel-off of the carbon thin film after lapse of a predetermined time period during which the press-forming step is repeated. If oxygen is contained in the atmosphere, the carbon thin film is oxidized and consumed by oxygen.

The present inventors have also studied about a glass substance which is capable of suppressing occurrence of a so-called pullout. The pullout is a phenomenon that the surface of the mold is scooped or removed in spots as described in the preamble of the instant specification. As a result, it has been confirmed that, at a low temperature of 630° C. for example, the pullout is undesiredly caused to occur when the glass substance contains arsenic oxide as a refining agent and a decoloring agent. On the other hand, inclusion of a predetermined content of antimony oxide is difficult to cause the pullout.

The above-mentioned studies by the present inventors have revealed the following. Upon production of a glass optical element by the use of a mold with a releasing carbon thin film formed on a molding surface to avoid fusion sticking, peel-off of the carbon thin film and a pullout can be effectively suppressed by the use of a glass substance which has a low softening point to enable press-forming or press-molding at a low-temperature and which does not contain arsenic oxide as a glass component. Throughout the instant specification, the term "arsenic oxide" includes $As_2O_3$ and $As_2O_5$.

This invention is based on the above-mentioned various studies and observations. According to this invention, a method of producing a glass optical element comprises the step of preparing a mold which has a molding surface of a material containing silicon carbide and/or silicon nitride as a main component. The molding surface is covered with a releasing carbon thin film which serves to avoid fusion sticking. The method further comprises the steps of introducing into the mold a glass substance which has a sag point not higher than 565° C. and which does not contain arsenic oxide as a glass component, and press-forming the glass substance in a heated and softened state. Herein, the "sag point" is determined in the following manner known in the art. Specifically, a load of 10 g is imposed on a glass sample of 5 mm in diameter and 20 mm in length and a thermal expansion is measured. The sag point is defined by a temperature at which an apparent thermal expansion is stopped and shrinkage is started in the glass sample. The sag point corresponds to a viscosity ranging from about $10^{10}$ to $10^{11}$ poises.

DESCRIPTION OF THE PREFERRED EMBODIMENTS

In a method of producing a glass optical element according to this invention, use is made of a mold having a molding surface of a material containing silicon carbide and/or silicon nitride as a main component. The molding surface is covered with a releasing carbon thin film which serves to prevent fusion sticking.

The above-mentioned mold may be made of silicon carbide and/or silicon nitride as a base material. In this event, the molding surface is formed as an integral part of the mold because its material is same as the base material of the mold. Alternatively, when a different base material such as cemented carbide is used, the molding surface is formed by a thin layer of silicon carbide and/or silicon nitride deposited on the base material, directly or indirectly through an intermediate layer. The thin layer of silicon carbide and/or silicon nitride is deposited by the use of a CVD method, a sputtering method, a plasma CVD method, or the like. Among those, deposition of silicon carbide and/or silicon nitride by the CVD method is preferred because of excellent compactness. Deposition of β-SiC by the CVD method is most preferred. It is noted here that the molding surface essentially contains silicon carbide and/or silicon nitride as a main component. Accordingly, the molding surface may be made of a material exclusively containing silicon carbide and/or silicon nitride. Use may also be made of a ceramics material, such as silicon nitride ceramics (SiAlON), containing at least 90 wt % of silicon carbide and/or silicon nitride.

In case where the molding surface is formed by the thin layer containing silicon carbide and/or silicon nitride as a main component and formed on the base material such as cemented carbide, the thickness of the thin layer is preferably between 0.02 and 2 $\mu$m.

More preferably, the molding surface is formed by a thick layer deposited on a sintered body of silicon carbide and/or silicon nitride by the CVD method. Preferably, the whole of the base material is produced by the CVD method.

On the other hand, the releasing carbon thin film formed on the molding surface of the mold preferably comprises a single component layer or a mixture layer having an amorphous and/or diamond-like structure because of excellent releasability. The releasing carbon thin film may have or may not have a C—H bond. The releasing carbon thin film is formed by any appropriate technique such as the sputtering method, the ion plating method, and the plasma CVD method depending on each material used therefor.

The releasing carbon thin film preferably has a thickness between 0.02 and 1 $\mu$m. When a thickness is smaller than 0.02 μm, the releasability becomes insufficient in the carbon thin film. On the other hand, the thickness over 1 μm deteriorates the surface roughness and makes it difficult to keep an internal configuration of the mold in a predetermined shape, namely, to maintain surface accuracy.

Prior to the formation of the releasing carbon thin film, an intermediate layer may be formed on the molding surface. Alternatively, the releasing carbon thin film may be-formed by a multilayer film.

In the method of producing a glass optical element according to this invention, a glass substance (i) has a sag point not higher than 565° C. and (ii) contains no $As_2O_3$ as a glass component. These requirements (i) and (ii) for the glass substance provides features of this invention.

The reason why the sag point is restricted in the above-mentioned requirement (i) is as follows. As will be demonstrated in specific embodiments which will later be given, the sag point exceeding 565° C. becomes a factor of generating the pullout on the surface of the mold. On the other hand, the sag point not higher than 565° C. effectively suppresses the occurrence of the pullout on the molding surface to achieve an extended lifetime of the mold. When the sag point exceeds 565° C., the pullout frequently occurs as compared with this invention, even if neither of $As_2O_3$ and $Sb_2O_3$ is contained.

The reason why no $As_2O_3$ is contained as a glass component in the above-mentioned requirement (ii) is as follows. As will be demonstrated in the specific embodiments which will later be given, inclusion of $As_2O_3$ is liable to frequently cause the pullout to occur when the glass substance is press-formed and cooled. On the other hand, exclusion of $As_2O_3$ serves to suppress the occurrence of the pullout.

For achieving refining and decoloring effects, addition of $As_2O_3$ or $Sb_2O_3$ is essential. In this respect, the present inventors have found out that, in a glass substance having a sag point not higher than 565° C. and a press-forming temperature not higher than 630° C., $Sb_2O_3$ does not act as a pullout generation factor although $As_2O_3$ does. In this connection, the glass substance is desired to contain $Sb_2O_3$ in view of the refining and the decoloring effects. The content of $Sb_2O_3$ is preferably between 0.01 and 0.5 wt %, more preferably, between 0.1 and 0.3 wt %.

The glass having a sag point not higher than 565° C. and containing no $As_2O_3$ preferably has a composition essentially consisting of, by weight, 28–55% $SiO_2$, 5–30% $B_2O_3$ ($SiO_2+B_2O_3$ being 46–70% and $SiO_2/B_2O_3$ being 1.3–12.0 (weight ratio)), 5–12% $Li_2O$, 0–5% $Na_2O$, 0–5% $K_2O$ ($Li_2O+Na_2O+K_2O$ being 5–12%), 0–40% BaO, 0–10% MgO, 0–23% CaO, 0–20% SrO, 0–20% ZnO (BaO+MgO+ CaO+SrO+ZnO being 10–44% and $SiO_2+B_2O_3+Li_2O+$ BaO+CaO being not smaller than 72%), 1–7.5% $Al_2O_3$, 0–3% $P_2O_5$, 0–15% $La_2O_3$, 0–5% $Y_2O_3$, 0–5% $Gd_2O_3$, 0–3% $TiO_2$, 0–3% $Nb_2O_5$, 0–5% $ZrO_2$ ($La_2O_3+Y_2O_3+$ $Gd_2O_3$ being 1–15%), and 0–0.5% $Sb_2O_3$.

Preferably, the above-mentioned composition essentially consists by weight of 30–55% $SiO_2$, 5–30% $B_2O_3$ ($SiO_2+$ $B_2O_3$ being 56–70%), 7–12% $Li_2O$, 0–3% $Na_2O$, 0–3% $K_2O$ ($Li_2O+Na_2O+K_2O$ being 7–12%), 0–30% BaO, 0–5% MgO, 0–23% CaO, 0–20% SrO, 0–10% ZnO ($SiO_2+B_2O_3+$ $Li_2O+$BaO+CaO being not smaller than 72%), 1–7.5% $Al_2O_3$, 0–2% $P_2O_5$, 0–10% $La_2O_3$, 0–3% $Y_2O_3$, 0–3% $Gd_2O_3$, 0–2% $TiO_2$, 0–2% $Nb_2O_5$, 0–3% $ZrO_2$ ($La_2O_3+$ $Y_2O_3+Gd_2O_3$ being 1–10%), and 0–0.5% $Sb_2O_3$.

Generally, lowering of the sag point deteriorates the chemical durability of the glass substance. According to this invention, the glass substance contains 5–12 wt % $Li_2O$ so that the sag point is lowered without deterioration of the chemical durability.

In this invention, the glass substance is preferably a dehydrated glass obtained by removing water contained in a glass material. The use of the dehydrated glass further suppresses the occurrence of the pullout. The dehydrated glass is produced by bubbling a glass melt with a bubbling gas to volatilize and remove the water in the glass melt. The bubbling gas preferably comprises a mixture of nitrogen and oxygen. For example, dry air is suitable because handling is easy.

The use of $SOCl_2$ gas increases the dehydration degree but is difficult to handle. In addition, residual sulphur and residual chlorine result in the occurrence of the pullout.

The total content of hydroxyl groups and water molecules contained in the dehydrated glass is preferably 50 ppm or less, more preferably 25 ppm or less, in order to prevent oxidization of the mold.

The glass substance is obtained by melting a glass material such as oxide, carbonate, and nitrate. At least within a scope of this invention, no tendency is observed to indicate that nitrate is inferior.

The glass substance is preferably formed as a bulk preform having a predetermined weight obtained by falling the glass melt from an outlet pipe of a glass melt furnace. The bulk preform may have a spherical shape or a marble shape. Preferably, the glass melt falling down from the outlet pipe is received at a floating position by the use of a reception plate which injects a gas. In this event, the preform has an entire surface comprising a free surface with substantially no defect such as wrinkling, projections, depressions, contamination, and sticking matters. Such preform is advantageous in several respects. Specifically, the preform does not have a surface hydrate layer (acting as a factor of oxidization of the mold) inherent to cold grinding. Secondly, the preform is free from an adverse influence from the sticking matters or the like which would otherwise be present. In addition, the glass substance can be produced from the preform at a low cost.

In the method of producing a glass optical element according to this invention, the above-mentioned glass substance is introduced into the mold and subjected to press-forming in a heated and softened state to obtain the glass optical element.

The press-forming is preferably carried out in a nonoxidizing atmosphere (for example, $N_2$ or 2% $H_2$+98% $N_2$) containing at most 15 ppm oxygen and at most 50 ppm water. The nonoxidizing atmosphere and the oxygen content not greater than 15 ppm are preferred because the oxygen content exceeding 15 ppm results in oxidization and consumption of the carbon thin film, followed by oxidization of silicon carbide or silicon nitride of the molding surface, thereby causing the pullout resulting from fusion sticking of the glass substance. The oxygen content not greater than 10 ppm is particularly preferred.

The water content in the atmosphere not greater than 50 ppm is preferred because the water content exceeding 50 ppm promotes oxidization of silicon carbide or silicon nitride of the molding surface to result in easy occurrence of the pullout while the water content not greater than 50 ppm suppresses the oxidization and the resultant pullout. The water content in the atmosphere equal to 25 ppm or less is particularly preferred.

In the above-mentioned method according to this invention, use is made of the glass having a sag point not higher than 565° C. and containing no $As_2O_3$. It is therefore possible to prevent surface oxidization of silicon carbide or silicon nitride which provides the molding surface of the mold. As a consequence, it is possible to remarkably reduce the probability of peel-off of the carbon thin film and the occurrence of the pullout of the molding surface. Thus, the lifetime of the mold can be considerably extended. As compared with the conventional glass having a sag point exceeding the above-mentioned level (565° C.) and containing $As_2O_3$, the probability of occurrence of the pullout can be reduced to ⅕ or less and the lifetime of the mold can be extended to 5 times or more according to this invention.

1st Embodiment (1) Consideration About the Sag Point

As described above, the pullout is caused to occur even if the mold has the releasing carbon thin film formed on the molding surface made of silicon carbide or silicon nitride, because silicon carbide or silicon nitride is exposed through film defects inevitably formed in the releasing carbon thin film and reacts with the glass substance to be scooped or removed together with the glass substance pressed by the mold.

In order to clearly demonstrate the effect of this invention, a mold (flat plate processed into a mirror surface) having a silicon carbide molding surface without a releasing carbon thin film was prepared. Various glass substances were prepared and press-formed by the use of the mold. The relationship between the sag point of each glass and the occurrence of the pullout was observed.

The glass substances used here had different sag points ranging between 520° C. and 590° C. and contained at least 0.01% $As_2O_3$. The refractive indexes $n_d$ were between 1.55 and 1.63. The Abbe numbers $v_d$ were 55 or more. Particularly, those glass substances having $n_d$ of 1.59 and $v_d$ of 61 were mainly used.

The press-forming condition was as follows:

Glass to be Molded: preform of a marble shape with a volume of 250 mm³ obtained by hot forming Glass Mold (Flat Plate): In order to find the glass unsusceptible to the pullout even if the the molding surface is slightly oxidized, the molding surface of the silicon carbide was slightly oxidized by the use of oxygen plasma to form an oxide layer having a thickness between 30 and 40 angstroms. For each glass, eight molds were used.

Atmosphere: 2% $H_2$+98% $N_2$

Press-Forming Temperature: the temperature corresponding to a glass viscosity of about $10^{6.9}$ poises which is slightly low as compared with the normal press-forming condition Press-Forming Pressure: 120 kg/cm²

Press-Forming Period: 60 seconds

Cooling Rate: 110° C./min

Number of Times of Press-Forming: five times for each of eight molds

Figure 1:
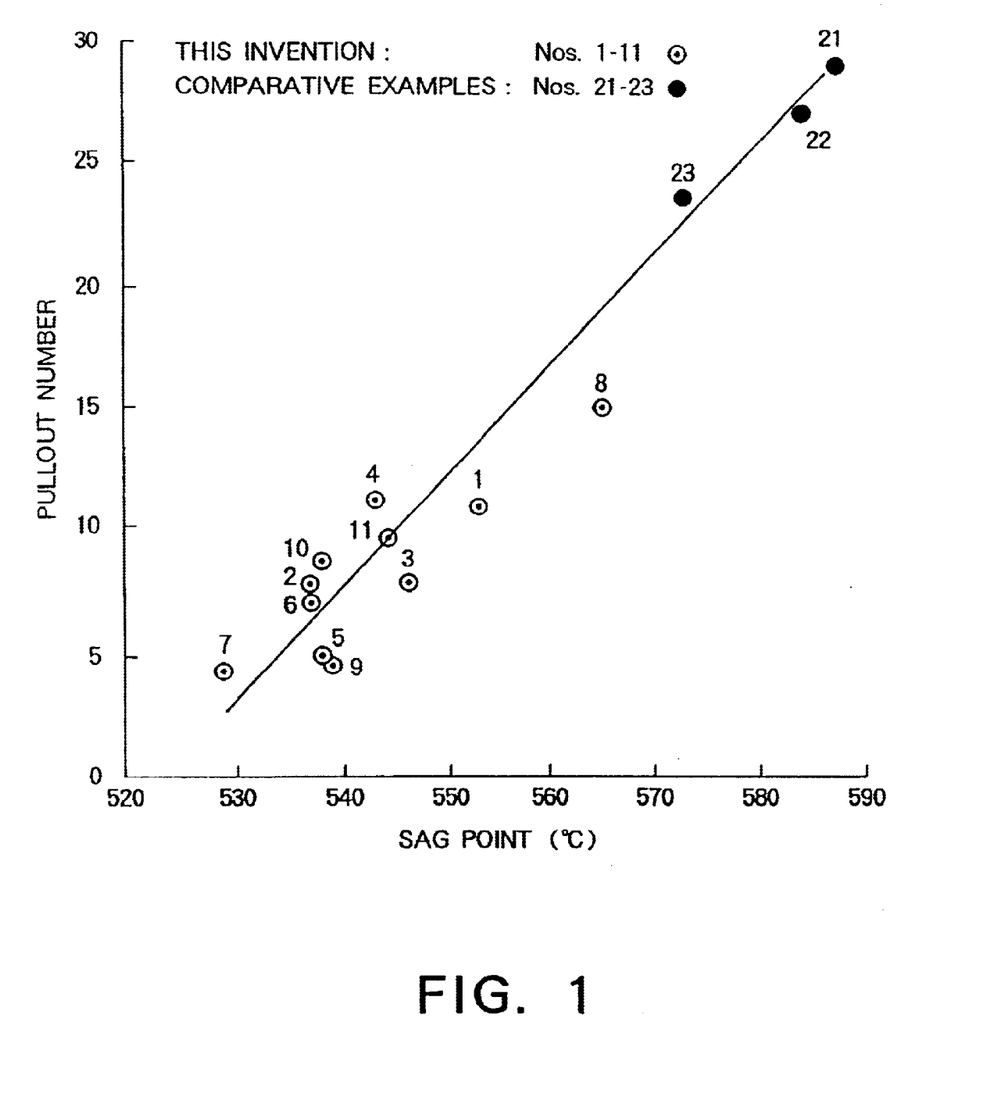
FIG. 1 shows the relationship between the sag points and pullout numbers of samples according to this invention and comparative examples.

The composition, the refractive index $n_d$, the Abbe number $v_d$, the transformation point Tg, the sag point Ts, the waterproofness Dw, the acidproofness Da, the press-forming temperature (corresponding to a glass viscosity of about $10^{6.9}$ poises), and the average pullout number are shown in Tables 1 and 2 for each glass used here. The average pullout number was calculated over the eight molds after five times of press-forming. The relationship between the sag point and the pullout number is shown in FIG. 1. From Tables 1 and 2 and FIG. 1, strong correlation is clearly observed between the sag point and the pullout number. It is shown that the use of the glass having a low sag point, namely, the glass allowing press-forming at a low temperature effectively suppresses the pullout and that the glass having a sag point not higher than 565° C. is preferred.

As described above, it has been confirmed by the use of the mold without the releasing thin film that the low sag point not higher than 565° C. effectively suppresses the occurrence of the pullout. In the press-forming according to this invention on the other hand, use is actually made of the mold having the releasing thin film formed on the molding surface. Obviously, by the use of the glass having a sag point not higher than 565° C., the probability of occurrence of the pullout is remarkably reduced as compared with the above-mentioned case without the releasing thin film. This will be described later in detail in conjunction with the third embodiment.

As seen from Table 2, a comparative glass No. 21 contains 0.1 wt % $As_2O_3$ and 0.2 wt % $Sb_2O_3$. Another comparative glass No. 22 contains 0.01 wt % $As_2O_3$ and 0.01 wt % $Sb_2O_3$. The former contains a greater amount of $As_2O_3$ and $Sb_2O_3$ than that in the latter. The glass No. 21 uses a nitrate material while the glass No. 22 does not. Nevertheless, only a slight difference in pullout number is observed from Table 2 and FIG. 1.

Glasses Nos. 9 and 10 of this invention exhibit the small pullout number although the nitrate material is used and the contents of $As_2O_3$ and $Sb_2O_3$ are relatively large.

Obviously, the use of the nitrate material and the presence of $As_2O_3$ and $Sb_2O_3$ in the glass substance have a very little influence upon the pullout as compared with the sag point of the glass substance. It is noted here that, since these glass samples contain at least 0.01 wt % $As_2O_3$, suppression of the pullout is realized by the low sag point of 565° C. or below but is insufficient.

In Tables 1 and 2, the glasses Nos. 1 to 8, 22 and 23 were prepared by the use of a glass material of $BaCO_3$ for BaO. The glass Nos. 9 to 11 and 21 were prepared by the use of a glass material containing 50% $BaCO_3$ and 50% $Ba(NO_3)_2$ for BaO. The glass No. 23 was prepared by the use of a glass material of $Sr(NO_3)_2$ for SrO. For other components, $H_3BO_3$, $SiO_2$, $Al(OH)_3$, $K_2CO_3$, $Li_2CO_3$, $CaCO_3$, ZnO, $La_2O_3$, $As_2CO_3$, $Sb_2CO_3$ were used. The waterproofness and the acidproofness are represented in terms of the weight loss ratio.

TABLE 1

| Composition | Glass No. This Invention | | | | | | |
|---|---|---|---|---|---|---|---|
| (wt %) | 1 | 2 | 3 | 4 | 5 | 6 | 7 |
| $B_2O_3$ | 22.7 | 22.6 | 22.6 | 21.0 | 22.6 | 21.5 | 23.5 |
| $SiO_2$ | 37.8 | 36.9 | 39.7 | 36.9 | 37.4 | 37.4 | 33.7 |

TABLE 1-continued

| Composition (wt %) | Glass No. This Invention | | | | | | |
|---|---|---|---|---|---|---|---|
| | 1 | 2 | 3 | 4 | 5 | 6 | 7 |
| $SiO_2 + B_2O_3$ | 60.5 | 59.5 | 62.3 | 67.9 | 60.0 | 58.9 | 57.2 |
| $SiO_2/B_2O_3$ | 1.67 | 1.63 | 1.76 | 1.76 | 1.65 | 1.74 | 1.43 |
| $Al_2O_3$ | 5.0 | 5.6 | 5.6 | 4.4 | 5.6 | 6.1 | 7.3. |
| $K_2O$ | — | — | — | — | — | — | — |
| $Li_2O$ | 8.0 | 9.3 | 8.3 | 9.0 | 9.3 | 8.8 | 8.8 |
| $Li_2O + Na_2O + K_2O$ | 8.0 | 9.3 | 8.3 | 9.0 | 9.3 | 8.8 | 8.8 |
| BaO | 21.5 | 22.1 | 23.1 | 21.5 | — | 21.7 | 24.5 |
| SrO | — | — | — | — | — | — | — |
| CaO | — | — | — | — | 22.1 | — | — |
| ZnO | — | — | — | — | — | — | — |
| $MgO + CaO + SrO + BaO + ZnO$ | 21.5 | 22.2 | 23.1 | 21.5 | 22.1 | 21.7 | 24.5 |
| $La_2O_3$ | 5.0 | 3.7 | 3.7 | 4.5 | 3.7 | 4.5 | 2.2 |
| $La_2O_3 + Y_2O_3 + Gd_2O_3$ | 5.0 | 3.7 | 3.7 | 4.5 | 3.7 | 4.5 | 2.2 |
| $As_2O_3$ | 0.01 | 0.01 | 0.01 | 0.01 | 0.01 | 0.01 | 0.01 |
| $Sb_2O_3$ | — | — | — | — | — | — | — |
| Refractive Index $n_d$ | 1.5883 | 1.5892 | 1.5889 | 1.5891 | 1.6030 | 1.5887 | 1.5891 |
| Abbe Number $v_d$ | 61.4 | 61.0 | 61.3 | 61.0 | 59.6 | 60.9 | 61.1 |
| Transformation Point (° C.) | 512 | 500 | 507 | 504 | 498 | 500 | 495 |
| Sag Point (° C.) | 553 | 537 | 546 | 543 | 538 | 537 | 529 |
| Waterproofness Dw (wt %) | 0.21 | 0.30 | 0.26 | 0.29 | 0.10 | 0.17 | 0.1 |
| Acidproofness Da (wt %) | 0.80 | 0.80 | 0.83 | 0.83 | 0.67 | 0.57 | 0.77 |
| Press-forming Temperature (° C.) | 612 | 597 | 607 | 606 | 595 | 600 | 600 |
| Average Pullout Number | 10.8 | 7.8 | 7.8 | 11.1 | 4.8 | 7.0 | 4.3 |

TABLE 2

| Composition (wt %) | Glass No. | | | | | | |
|---|---|---|---|---|---|---|---|
| | This Invention | | | | Comparative Sample | | |
| | 8 | 9 | 10 | 11 | 21 | 22 | 23 |
| $B_2O_3$ | 27.4 | 24.0 | 11.5 | 24.0 | 19.5 | 19.5 | 20.0 |
| $SiO_2$ | 39.4 | 37.8 | 47.2 | 38.2 | 39.4 | 39.4 | 39.2 |
| $SiO_2 + B_2O_3$ | 66.8 | 61.8 | 58.7 | 62.2 | 58.9 | 58.9 | 59.2 |
| $SiO_2/B_2O_3$ | 1.44 | 1.58 | 4.10 | 1.59 | 2.02 | 2.02 | 1.96 |
| $Al_2O_3$ | 5.0 | 5.0 | 3.2 | 5.5 | 5.0 | 5.0 | 6.0 |
| $K_2O$ | — | — | 1.5 | — | — | — | — |
| $Li_2O$ | 7.0 | 8.5 | 7.3 | 8.0 | 5.0 | 5.0 | 5.3 |
| $Li_2O + Na_2O + K_2O$ | 7.0 | 8.5 | 8.8 | 8.0 | 5.0 | 5.0 | 5.3 |
| BaO | — | 16.1 | 21.8 | 12.6 | 25.4 | 24.5 | 8.5 |
| SrO | — | — | — | — | — | — | 13.7 |
| CaO | 17.5 | 5.0 | — | 7.3 | 2.0 | 2.0 | 3.6 |
| ZnO | — | — | 5.0 | — | — | — | — |
| $MgO + CaO + SrO + BaO + ZnO$ | 17.5 | 21.1 | 26.8 | 19.9 | 27.4 | 26.5 | 25.8 |
| $La_2O_3$ | 3.0 | 3.0 | 2.0 | 4.1 | 3.0 | 3.0 | 3.0 |
| $La_2O_3 + Y_2O_3 + Gd_2O_3$ | 3.0 | 3.0 | 2.0 | 4.1 | 3.0 | 3.0 | 3.0 |
| $As_2O_3$ | 0.01 | 0.10 | 0.50 | 0.01 | 0.10 | 0.01 | 0.0 |
| $Sb_2O_3$ | 0.01 | 0.20 | — | 0.01 | 0.20 | 0.01 | 0.0 |
| Refractive Index $n_d$ | 1.5907 | 1.5891 | 1.5831 | 1.5891 | 1.5891 | — | 1.589 |
| Abbe Number $v_d$ | 61.4 | 61.3 | 59.5 | 61.3 | 61.3 | — | 61.3 |
| Transformation Point(° C.) | 530 | 502 | 498 | 514 | 545 | 542 | 536 |
| Sag Point (° C.) | 565 | 539 | 538 | 545 | 587 | 584 | 573 |
| Waterproofness Dw (wt %) | 0.11 | 0.11 | 0.04 | 0.08 | 0.08 | 0.09 | 0.0 |
| Acidproofness Da (wt %) | 0.81 | 0.83 | 0.36 | 0.70 | 0.82 | 0.83 | 0.7 |
| Press-forming Temperature (° C.) | 630 | 605 | 615 | 615 | 670 | 670 | 650 |
| Average Pullout Number | 14.8 | 4.5 | 8.7 | 10.0 | 28.7 | 26.8 | 23.3 |

(2) Consideration about the Content of $As_2O_3$ and $Sb_2O_3$ $As_2O_3$ and $Sb_2O_3$ are contained in the glass composition as a refining agent. The mechanism of the refining agent will presently be described in conjunction with $As_2O_3$ by way of example. In a glass melting step, $As_2O_3$ takes $O_2$ from nitrate to form $As_2O_5$. In a subsequent clarifying step, $As_2O_5$ releases $O_2$ to thereby act as the refining agent. Advantageously, $As_2O_3$ can take excessive $O_2$ again in a later cooling step. This also applies to $Sb_2O_3$.

Consideration will herein be made of the influence of the contents of $As_2O_3$ and $Sb_2O_3$ upon the occurrence of the pullout.

In order to examine whether or not silicon carbide is oxidized by inclusion of $As_2O_3$ and $Sb_2O_3$ to cause the pullout to occur, use was made of the mold (silicon carbide) from which the oxidized surface layer was removed by the use of hydrogen fluoride aqueous solution.

At first, eleven samples (a) to (k) of hot-formed preforms of a marble shape were prepared with a basic composition similar to the glass No. 11 (having a sag point of 545° C.) in Table 2 except that the contents of $As_2O_3$ and $Sb_2O_3$ are different. For the eleven samples (a) to (k), the contents of $As_2O_3$ and $Sb_2O_3$ and the coloring degrees are shown in Table 3 and the press-forming conditions are shown in Table 4.

TABLE 3

| Sample No. | $As_2O_3$ (wt %) | $Sb_2O_3$ (wt %) | Material for BaO | Coloring Degree ($\lambda_T = 80\%/\lambda_T = 5\%$) (nm) |
|---|---|---|---|---|
| (a) | 0 | 0 | $BaCO_3$ | 384/289 |
| (b) | 0.01 | 0.01 | | 348/284 |
| (c) | 0.06 | 0.06 | | 347/284 |
| (d) | 0.15 | 0.15 | | 350/286 |
| (e) | 0.20 | 0.20 | | 351/286 |
| (f) | 0 | 0.12 | | 346/286 |
| (g) | 0 | 0.30 | | 346/291 |
| (h) | 0 | 0.40 | | 346/291 |
| (i) | 0 | 0 | $Ba(NO_3)_2$ | 380/287 |
| (j) | 0.15 | 0.15 | | 353/287 |
| (k) | 0 | 0.30 | | 343/286 |

TABLE 4

| | |
|---|---|
| Press-Forming Temperature | 615 ° C. |
| Press-Forming Load | 110 kg/cm$^2$ |
| Press-Forming Period | 600 sec |
| Cooling Rate | −110 °C./min |
| Atmosphere | $N_2 + H_2$ (dry column used) |
| Number of Times of Press-Forming | five |
| Preform | hot-formed article of a marble shape |
| Preprocessing of Mold | acid treatment |
| Number of Molds | eight flat-plate mold per each condition |

Figure 2:
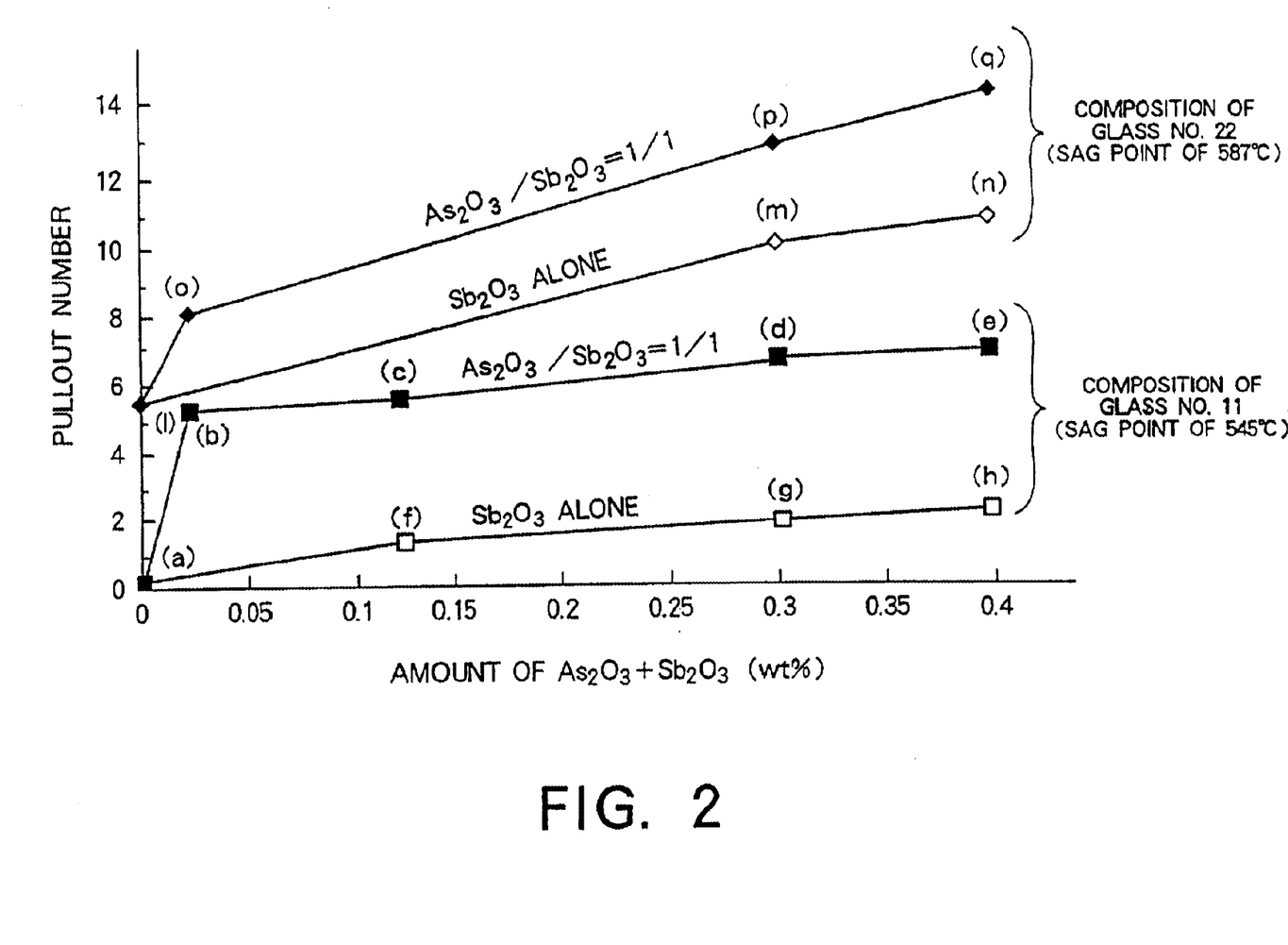
FIG. 2 shows the relationship between amounts of $As_2O_3$ and $Sb_2O_3$ and the pullout numbers of samples according to this invention and comparative examples.

The relationship between the content (wt %) of $As_2O_3$ and/or $Sb_2O_3$ and the pullout number after five times of press-forming is illustrated in FIG. 2. As seen from FIG. 2, the samples (f), (g), and (h) containing $Sb_2O_3$ without $As_2O_3$ exhibit the pullout number as small as one, two, and two, respectively. In contrast, the samples (b), (c), (d), and (e) containing both $As_2O_3$ and $Sb_2O_3$ at a ratio of 1/1 exhibit the pullout number as large as five or six. In other words, by the use of the glass substance containing no $As_2O_3$, it is possible to remarkably reduce the pullout number.

The samples (i), (j), and (k) using $Ba(NO_3)_2$ as the material for BaO show the result substantially similar to that of the samples (a) to (h) using $BaCO_3$ as the material for BaO.

On the other hand, consideration will be made about the case where the glass No. 22 (having a sag point of 587° C. beyond the range specified in this invention and a press-forming temperature of 670° C.) is adopted as a basic glass composition. As obvious from FIG. 2, the sample (1) containing neither $As_2O_3$ nor $Sb_2O_3$ and the samples (m) and (n) containing $Sb_2O_3$ without $As_2O_3$ exhibit the pullout number as many as 5.5 and 10, respectively. Thus, the occurrence of the pullout is distinct. The samples (o), (p), and (q) containing $As_2O_3$ and $Sb_2O_3$ at a ratio of 1/1 exhibit further distinct occurrence of the pullout.

From the above-mentioned results, it has been found out that even a little amount of $As_2O_3$ seriously adversely affect the occurrence of the pullout while a little amount of $Sb_2O_3$ brings about no problem as far as the sag point falls within the range specified in this invention.

Second Embodiment

In order to examine the influence of the water contained in the glass substance, the dehydrated glass was prepared as follows. Preparation was made of a glass material having a basic composition similar to the glass No. 1 in Table 1 except that no $As_2O_3$ was contained but 0.12% $Sb_2O_3$ was contained. During the melting step, a mixture gas of 80 vol % $N_2$ and 20 vol % $O_2$ was made to pass through the glass melt for bubbling to remove the water contained therein. The dehydrated glass thus obtained had a water content of 14 ppm. For comparison, the undehydrated glass subjected to no dehydration process was prepared and had a water content of 95 ppm. The mold was subjected to acid treatment in the manner similar to that mentioned above to leave substantially no oxide layer on the molding surface. The press-forming atmosphere having the water content not greater than 50 ppm was produced by removing the excessive water. Under the conditions defined in Table 3, the press-forming was carried out five times for each of the dehydrated glass and the undehydrated glass. As a result, the pullout number was 1.2 in the undehydrated glass having the water content of 95 ppm while the pullout number was reduced down to 0.6 in the dehydrated glass having the water content of 14 ppm. Further studies have revealed that the pullout is very effectively reduced when the total content of hydroxyl groups and water molecules contained in the glass substance is 50 ppm or less in terms of water molecules.

Third Embodiment

Description will be made as regards an embodiment of practically forming a double-convex lens having an outer diameter of 12 mm.

Upper and lower molds having molding surfaces made of silicon carbide deposited by the CVD method were prepared and finished. On each of the molding surfaces, an i-carbon film was formed by the ion plating method to the thickness of 500 angstroms. The upper and the lower molds having the concave molding surfaces were combined with a columnar mold to form a complete mold. Ten sets of such molds were prepared for each of the sample of this invention and one comparative example. The glass of the sample of this invention had a basic composition similar to the glass No. 11 (having a transformation point of 514° C. and a sag point of 545° C.) in Table 2 except that no $As_2O_3$ was contained but 0.2% $Sb_2O_3$ was contained. The glass was melted into the glass melt. The glass melt was made to fall down from the outlet pipe and received at a floating position by the use of a reception plate injecting nitrogen gas. Thus, the preform of a marble shape was obtained by hot forming. On the other hand, the comparative example had a glass composition similar to the glass No. 22 in Table 2 (having a transformation point of 514° C. and a sag point of 545° C.) with 0.1% $As_2O_3$ and 0.2% $Sb_2O_3$ contained. In the manner similar to that described above, the preform of a marble shape was obtained by hot forming.

A press-forming apparatus was kept at an atmosphere which contained 2% $H_2$ and 98% $N_2$ and which was dehydrated by the dry column. The preform was placed in the mold and subjected to heating, press-forming, cooling, and removal. The series of those steps were repeated. The press-forming was carried out at a press-forming temperature corresponding to a glass viscosity of $10^{7.8}$ poises. The press-forming temperature was equal to 592° C. and 645° C. in the sample of this invention and in the comparative example, respectively.

Figure 3:
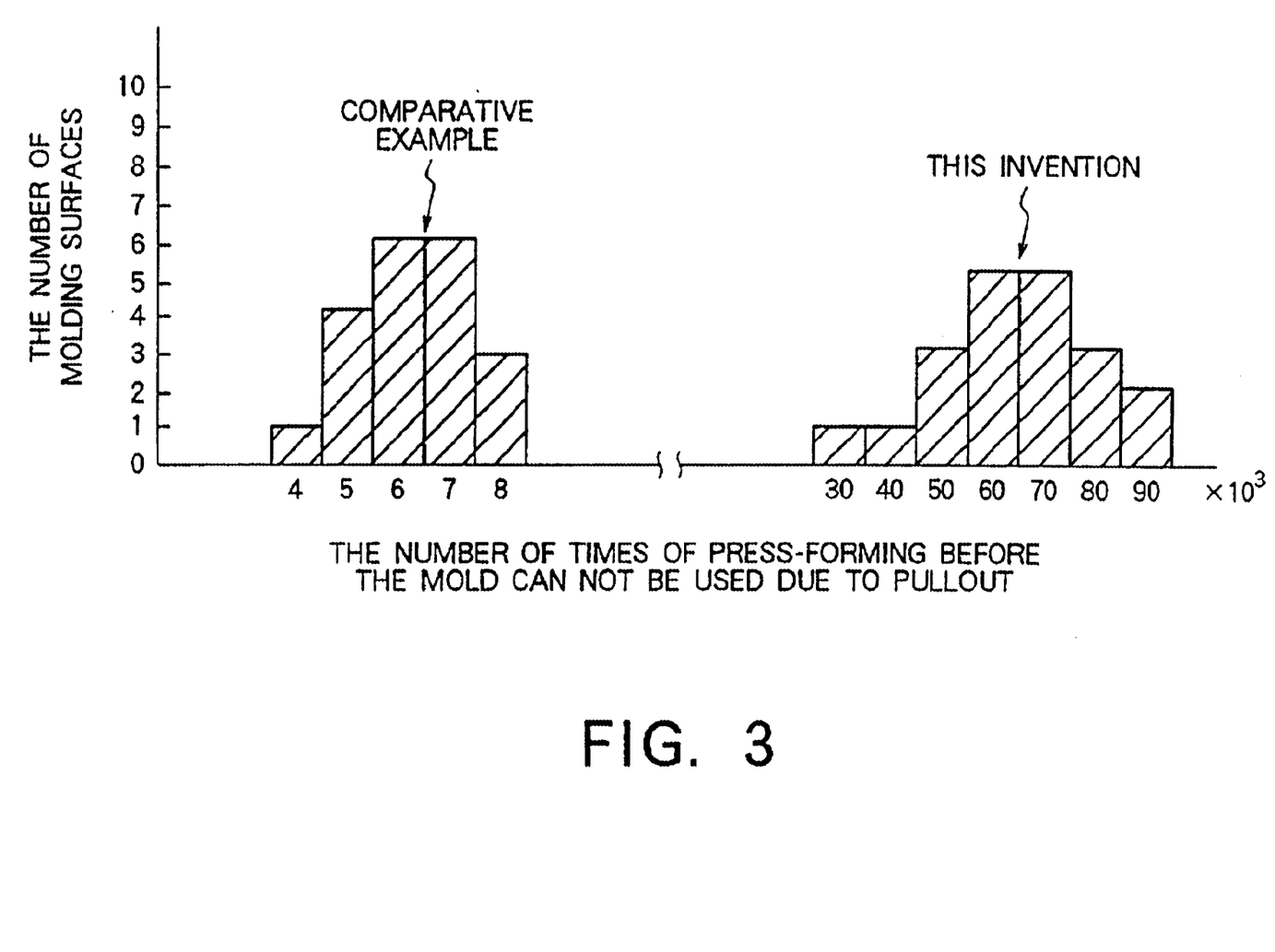
FIG. 3 is a graph showing a lifetime of a mold according to this invention in comparison with one comparative example.

For each mold, the i-carbon film was removed at every 300 times of the press-forming and a new i-carbon film was formed. After repeating the press-forming for each of ten molds (twenty molding surfaces), the pullout was finally caused to occur and transferred onto the surface of the lens which therefore has a defective appearance. In this event, the mold can not be used any longer. The number of times of the press-forming repeated before the mold can not be used any longer is shown in FIG. 3 as the lifetime of the mold. As seen from FIG. 3, the lifetime of the mold in the comparative example ranged between 4000 and 8000 times. On the other hand, in the sample of this invention, the lifetime was remarkably improved to a range between 30000 and 90000 times. If the dehydrated glass is used, the lifetime of the mold is further improved.

In the above-mentioned method of this invention, the peel-off of the carbon thin film formed on the molding surface and the occurrence of the pullout of silicon carbide and/or silicon nitride can be effectively suppressed. Therefore, the mold has an extended lifetime and a resultant glass optical element has a high quality with a reduced number of defects.

What is claimed is:

1. A method of producing a glass optical element with high precision by press molding a glass substrate, comprising the steps of:

preparing a mold which comprises β-SiC formed by the CVD method at least in a molding surface;

preparing a glass substrate which has a sag point not higher than 565° C. and which is substantially free from arsenic oxide; and press molding the glass substance into the glass optical element.

2. The method of claim 1 wherein the molding surface is covered with a releasing film.

3. The method of claim 2, wherein the releasing film comprises carbon.

4. The method of claim 2, wherein the press molding is carried out at a press temperature not higher than 630° C.

5. The method of claim 2, wherein the glass substance includes $SiO_2$.

6. The method of claim 5, wherein the glass substance further includes $LiO_2$.

7. The method of claim 6, wherein the glass substance includes, by weight, 28–55% $SiO_2$ and 5–30% $B_2O_3$, wherein $SiO_2+B_2O_3$ being 46–70%, and the weight ratio $SiO_2/B_2O_3$ being 1.3–12.0.

8. The method of claim 6, wherein the glass substance further includes, by weight, 5–12% $Li_2O$.

9. The method of claim 7, wherein the glass substance further comprises, by weight, 0–5% $Na_2O$, 0–5% $K_2O$, $Li_2O+Na_2O+K_2O$ being 5–12%, 0–40% BaO, 0–10 MgO, 2–23% CaO, 0–20% SrO, 0–20% ZnO, BaO+MgO+CaO+SrO+ZnO being 10–44%, $SiO_2+B_2O_3+Li_2O+BaO+CaO$ being not smaller than 72%, 1–7.5% $Al_2O_3$, 0–3% $P_2O_5$, 0–15% $La_2O_3$, 0–5% $Y_2O_3$, 0–5% $Gd_2O_3$, 0–3% $TiO_2$, 0–3% $Nb_2O_5$, 0–5% $ZrO_2$, $La_2O_3+Y_2O_3+Gd_2O_3$ being 1–15%.

10. The method of claim 5, wherein the glass substance further comprises $Sb_2O_3$.

11. The method of claim 10, wherein the glass substance comprises, by weight, 0–0.5% $Sb_2O_3$.

12. The method of claim 1, wherein the glass substance is formed by dehydrated glass.

13. The method of claim 2, wherein the glass substance is formed by dehydrated glass.

14. The method of claim 12, wherein a total content of hydroxyl groups and water molecules contained in the dehydrated glass is not higher than 50 ppm.

15. The method of claim 13, wherein a total content of hydroxyl groups and water molecules contained in the dehydrated glass is not higher than 50 ppm.

16. The method of claim 2, wherein the glass substance preparing step comprises the steps of:

causing glass melt of a predetermined weight to flow down through an outlet pipe of a glass melting furnace;

forming a bulk preform from said glass melt to make the glass substance.

17. The method of claim 16, wherein the bulk preform forming step comprises the steps of:

dripping said glass melt over a reception plate through the outlet pipe; and floating the dripped glass melt on the reception plate by injecting a gas through the reception plate to obtain the bulk preform.

18. The method of claim 2, wherein the press molding is carried out in a non-oxidizing atmosphere.

19. The method of claim 18, wherein the non-oxidizing atmosphere includes a water content not greater than 50 ppm.

20. The method of claim 17, wherein the press molding is carried when the glass substance has a viscosity within a range of $10^7$ to $10^9$ poises.

21. The method of claim 19, wherein the press molding is carried out by introducing the glass substance into the mold when the glass substance is softened.

22. A method of producing a glass optical element with high precision by press molding a glass substance, comprising the steps of:

preparing a mold which has a molding surface comprising silicon and which is polished into a mirror surface;

preparing a glass substance which has a sag point not higher than 565° C. and which is substantially free from arsenic oxide; and press molding the glass substance into the glass optical element wherein the molding surface comprises β-SiC formed by the CVD method.

23. A method of producing a glass optical element with high precision by press molding a glass substance, comprising:

preparing a mold which comprises β-SiC formed by a CVD method at least in a molding surface;

preparing a glass substance which is substantially free from arsenic oxide; and press molding the glass substance at a press temperature not higher than 630° C. into the glass optical element.

24. The method of claim 23, wherein the releasing film comprises carbon.

25. The method of claim 24, wherein the glass substance comprises $Sb_2O_3$.

26. The method of claim 25, wherein the glass substance further comprises $SiO_2$.

27. The method of claim 26, wherein the glass substance includes, by weight, 28–55% $SiO_2$ and 5–30% $B_2O_2$, wherein $SiO_2+B_2O_3$ falls within a range between 46 and 70% and the weight ratio $SiO_2/B_2O_3$ is between 1.3 and 12.0.

28. The method of claim 27, wherein the glass substance further includes, by weight, 5–12% $Li_2O$.

29. The method of claim 23, wherein the glass substance comprises, by weight, 0–0.5% $Sb_2O_3$.

30. The method of claim 25, wherein the press molding is carried out in a non-oxidizing atmosphere.

31. The method of claim 30, wherein the press molding is carried out when the glass substance has a viscosity within a range of $10^7$ to $10^9$ poises.

32. The method of claim 31, wherein the press molding is carried out by introducing the glass substance into the mold when the glass substance is softened.

* * * * *